US007329443B2

(12) United States Patent
Masuki et al.

(10) Patent No.: US 7,329,443 B2
(45) Date of Patent: Feb. 12, 2008

(54) RESIN CONTAINER

(75) Inventors: Tatsuya Masuki, Hiratsuka (JP); Tahara Hisashi, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 10/616,538

(22) Filed: Jul. 9, 2003

(65) Prior Publication Data

US 2004/0028855 A1 Feb. 12, 2004

(30) Foreign Application Priority Data

Jul. 11, 2002 (JP) ............................. 2002-202170

(51) Int. Cl.
*B65D 1/34* (2006.01)
*B65D 85/00* (2006.01)
*B29D 22/00* (2006.01)

(52) U.S. Cl. .................. 428/35.7; 428/34.1; 428/36.6; 428/36.92; 206/701; 206/706; 206/710; 264/513

(58) Field of Classification Search ............... 428/34.1, 428/35.7, 36.6, 36.92; 206/701, 706, 710
See application file for complete search history.

(56) References Cited

U.S. PATENT DOCUMENTS 4,895,892 A * 1/1990 Satake et al. ............... 524/520
5,648,136 A * 7/1997 Bird ............................ 428/76
5,888,630 A * 3/1999 Sylvester et al. ........... 428/212

* cited by examiner

*Primary Examiner*—Rena Dye
*Assistant Examiner*—Walter B Aughenbaugh
(74) *Attorney, Agent, or Firm*—Edwards Angell Palmer & Dodge LLP; David G. Conlin, Esq.; Mark D. Russett, Esq.

(57) ABSTRACT

A resin container is provided which has a container body and a lid for closing the container body. The container body of the resin container is produced by injection-molding an amorphous thermoplastic resin. The container body form has a peripheral rise portion and a recessed flat portion defined by the peripheral rising portion. The peripheral rise portion has a height of 0.5 to 10 mm, and the recessed flat portion has an area of 1 to 100 cm$^2$, an average wall thickness of not more than 0.25 mm and a flatness of not more than 0.5 mm.

10 Claims, 4 Drawing Sheets

RESIN CONTAINER

BACKGROUND OF THE INVENTION

The present invention relates to a resin container, and more particularly, to a resin container constituting an outer shell mainly for electric parts such as battery packs.

In electric parts such as battery packs, memory sticks and SD cards, an outer shell thereof is constituted by a resin container. In recent years, such a resin container has been required to have a much thinner wall thickness in order to further reduce a size of these electric parts and enhance an accommodation capacity thereof.

As raw materials for the resin container, the use of amorphous resins are recommended from the standpoint of good dimensional stability thereof. However, the amorphous resins are deteriorated in flow as compared to crystalline resins, so that injection-molded products produced therefrom fail to have a small wall thickness. For example, when the amorphous resins are injection-molded into a thin wall container having a wall thickness of not more than 0.25 mm, the obtained container is deteriorated in surface smoothness due to the poor flow upon molding. Therefore, such a container not only has a low commercial value, but also causes such a problem that upon the sealing step after accommodating contents therein, i.e., upon welding a lid onto the container body, it may be difficult to accurately mate shapes thereof such as peripheral edges with each other, resulting in defective bonding therebetween.

SUMMARY OF THE INVENTION

The present invention has been attained in view of the above problems. An object of the present invention is to provide a resin container having a wall thickness as thin as not more than 0.25 mm and an excellent flatness, in particular, a thin wall container suitably used as a container constituting an outer shell for electric parts.

As a result of the present inventors' earnest study on various molding methods using amorphous thermoplastic resins for solving the above problem, it has been found that the above object can be achieved by a resin container having a specific structure which is produced by injection-molding an amorphous thermoplastic resin. The present invention has been attained on the basis of this finding.

To accomplish the aim, in an aspect of the present invention, there is provided a resin container comprising a container body and a lid for closing the container body, said container body being produced by injection-molding an amorphous thermoplastic resin and comprising a peripheral rise portion and a recessed flat portion defined by the peripheral rise portion, said peripheral rise portion having a height of 0.5 to 10 mm, and said recess flat portion having an area of 1 to 100 cm$^2$, an average wall thickness of not more than 0.25 mm and a flatness of not more than 0.5 mm.

DETAILED DESCRIPTION OF THE INVENTION

Figure 1:
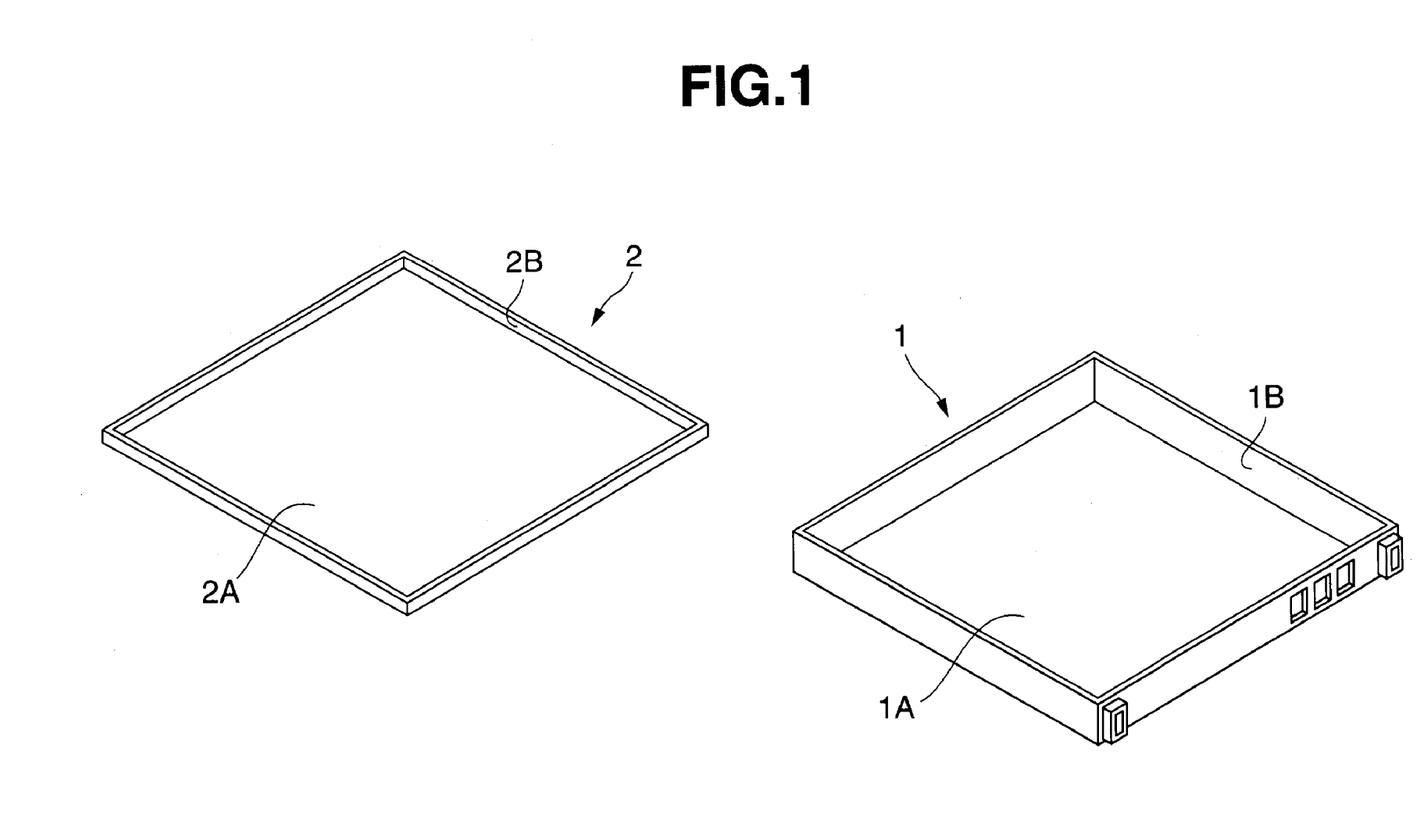
FIG. 1 is an expanded perspective view showing a container for a battery pack as an example of the resin container of the present invention.
Figure 2:
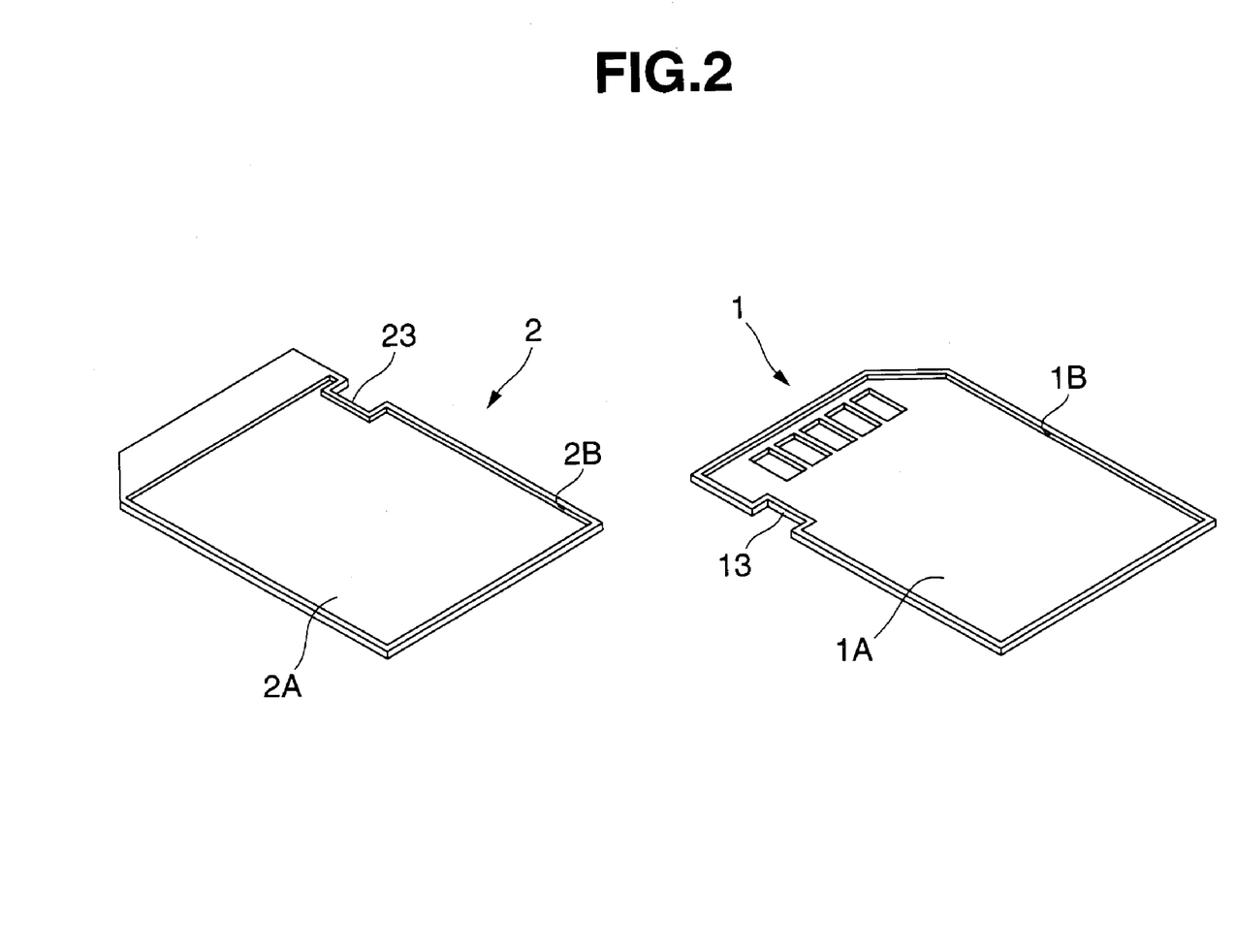
FIG. 2 is an expanded perspective view showing a container for a memory card as another example of the resin container of the present invention.
Figure 3:
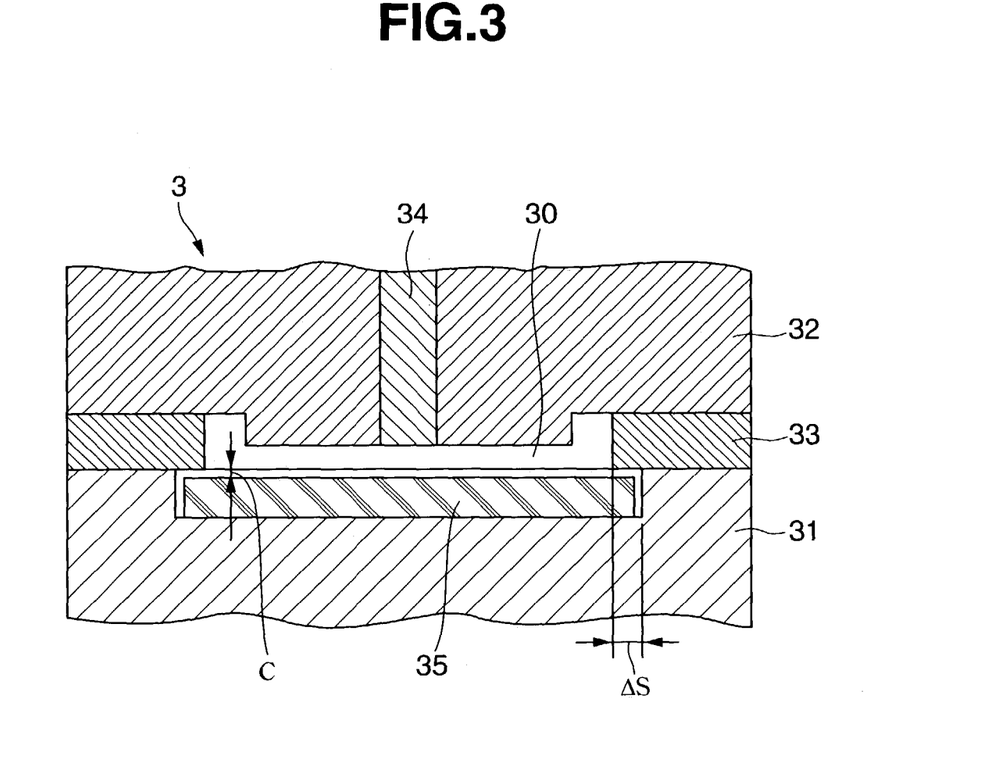
FIG. 3 is a vertical cross-sectional view showing an example of construction of a metal mold assembly for forming the resin container of the present invention.
Figure 4:
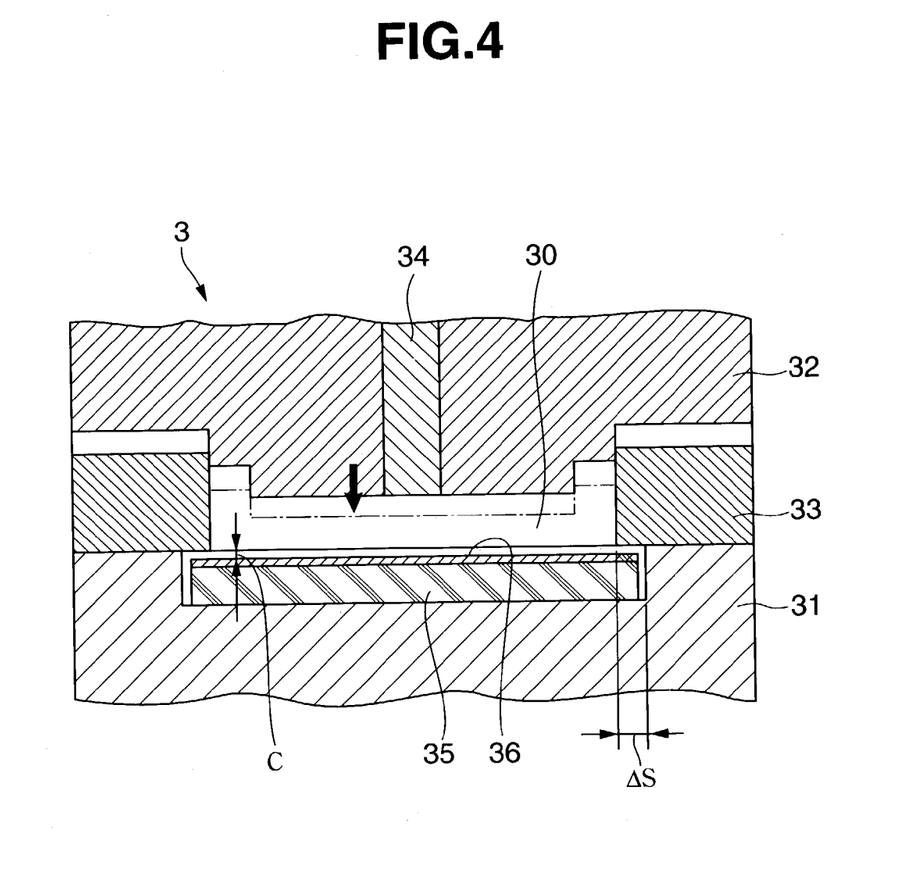
FIG. 4 is a vertical cross-sectional view showing another example of construction of a metal mold assembly for forming the resin container of the present invention.

The resin container according to the preferred embodiments of the present invention will be explained in detail below by referring to the accompanying drawings in which FIG. 1 is an expanded perspective view showing a container for a battery pack as an example of the resin container of the present invention; FIG. 2 is an expanded perspective view showing a container for a memory card as another example of the resin container of the present invention; FIG. 3 is a vertical cross-sectional view showing an example of construction of a metal mold assembly for forming the resin container of the present invention; and FIG. 4 is a vertical cross-sectional view showing another example of construction of a metal mold assembly for forming the resin container of the present invention. Meanwhile, in the following descriptions for the preferred embodiments of the present invention, the resin container is referred to merely as "container".

As shown in FIGS. 1 and 2, the container of the present invention comprises a container body (1) and a lid member (2) for closing the container body (1), and is suitably used as a container constituting an outer shell (cover) for small size electric parts, in particular, battery packs used in portable telephones, portable stereos, mobile personal computers, etc., or card-type information recording media such as memory cards and SD cards.

The container shown in FIG. 1 is applied to the battery pack, and the container shown in FIG. 2 is applied to the memory card. In the respective containers illustrated in FIGS. 1 and 2, at least the container body (1) is produced by injection-molding an amorphous thermoplastic resin, and include a recessed flat portion (1A) surrounded by a peripheral rise portion (1B).

More specifically, the container shown in FIG. 1 has a generally flat rectangular parallelepiped outer shape. The container body (1) includes the flat portion (1A) of a square shape in plan, and the peripheral rise portion (1B) provided along an entire periphery (all four sides) of the flat portion (1A) which corresponds to a side wall of the container. Longitudinal and lateral lengths of the flat portion (1A) are set so as to be larger than the height of the peripheral rise portion (1B). The peripheral rise portion (1B) is provided at its part corresponding to one side of the flat portion (1A), with holes through which terminals are pulled out and exposed outside.

In the container shown in FIG. 1, the lid (2) may also be produced by injection-molding an amorphous thermoplastic resin, and includes a recessed flat portion (2A) surrounded by a peripheral rise portion (2B), and longitudinal and lateral lengths of the flat portion (2A) are set so as to be larger than a height of the peripheral rise portion (2B), similarly to the container body (1).

On the other hand, the container shown in FIG. 2 has a generally flat heptahedron outer shape, i.e., a generally flat rectangular parallelepiped outer shape one corner of which is cut or chamfered. The container body (1) includes a flat portion (1A) having an approximately pentagonal shape in plan, and a peripheral rise portion (1B) provided along an entire periphery of the flat portion (1A) which corresponds to a side wall of the container. A length of each side of the flat portion (1A) is set so as to be larger than the height of the peripheral rise portion (1B). The flat portion (1A) is provided at a portion along one side thereof with holes through which terminals are pulled out and exposed outside.

Further, in the container shown in FIG. 2, a lid (2) may also be produced by injection-molding an amorphous thermoplastic resin, and includes a recessed flat portion (2A) surrounded by a peripheral rise portion (2B), similarly to the container body (1). The peripheral rise portion (2B) of the lid (2) has a larger width along one side of the flat portion (2A) in view of contents (electric parts) to be accommodated, so that the recessed flat portion (2A) is formed into a square shape in plan. In addition, longitudinal and lateral lengths of the flat portion (2A) are set so as to be larger than the height of the peripheral rise portion (2B). Meanwhile, in the container shown in FIG. 2, the container body (1) and the lid (2) are provided along one side periphery thereof with notched portions (13) and (23), respectively, which constitute grooves engaging with associated devices.

In the container of the present invention, the container body (1) is produced from the following materials by the following molding methods, and the flatness, surface waviness and sink mark depth of the flat portion (1A) thereof are limited to specific values. Similarly, the lid (2) is produced using the same materials and molding methods as those used for the container body (1), and the flatness, surface waviness and sink mark depth of the flat portion (2A) thereof are also limited to specific values. The container body (1) as a typical example is described in detail below.

The amorphous thermoplastic resin used in the present invention means such resins having a heat of crystallization ($\alpha Hc$) of less than 3 Joule/g, preferably less than 1 Joule/g as measured by a differential scanning calorimeter, e.g., "PYRIS Diamond DSC" manufactured by PERKIN-ELMER INC. Examples of the amorphous thermoplastic resin may include, but are not particularly limited to, styrene-based resins such as polystyrene, high-impact polystyrene (HIPS), AS resins and ABS resins; acrylic resins such as polymethyl methacrylate (PMMA); polyphenylene ether-based resins such as modified PPE; polycarbonate resins; polysulfone resins; polyarylate resins; polyether imide resins; and mixtures thereof. Of these resins, preferred are aromatic polycarbonate resins, styrene-based resins, polyphenylene ether-based resins, etc.

The above aromatic polycarbonate resins may be prepared, for example, by reacting phosgene or a carbonic acid diester with an aromatic dihydroxy compound or a mixture of an aromatic dihydroxy compound and a small amount of a polyhydroxy compound according to an interfacial polycondensation method (phosgenation method) or a melt polymerization method (transesterification method). The obtained aromatic polycarbonate resins may have a branched structure by appropriately selecting the raw materials, and further may be in the form of either a homopolymer or a copolymer.

The aromatic dihydroxy compound used as the raw material may be at least one compound selected from the group consisting of 2,2-bis(4-hydroxyphenyl)propane (=bisphenol A), tetramethyl bisphenol A, bis(4-hydroxyphenyl)-p-diisopropyl benzene, hydroquinone, resorcinol and 4,4'-dihydroxydiphenyl. Of these compounds, preferred is bisphenol A.

The branched aromatic polycarbonate resins may be obtained by using a polyhydroxy compound such as phloroglucinol, 4,6-dimethyl-2,4,6-tris(4-hydroxyphenyl)-2-heptene, 4,6-dimethyl-2,4,6-tris(4-hydroxyphenyl) heptane, 2,6-dimethyl-2,4,6-tris(4-hydroxyphenyl)-3-heptene, 1,3,5-tris(4-hydroxyphenyl)benzene and 1,1,1-tris(4-hydroxyphenyl)ethane, together with the above aromatic dihydroxy compound. In addition to the polyhydroxy compound, there may also be used 3,3-bis(4-hydroxyaryl)oxyindole (=isatin bisphenol), 5-chloroisatin bisphenol, 5,7-dichloroisatin bisphenol, 5-bromoisatin bisphenol, etc. The polyhydroxy compound, etc. that are used together with the aromatic dihydroxy compound, may be used in an amount of usually 0.01 to 10 mol %, preferably 0.1 to 2 mol %.

In the present invention, it is recommended to use, in particular, aromatic polycarbonate resins derived from 2,2-bis(4-hydroxyphenyl)propane, or aromatic polycarbonate copolymer resins derived from 2,2-bis(4-hydroxyphenyl)propane and other aromatic dihydroxy compounds. Further, the aromatic polycarbonate resins may have a siloxane structure, and may be copolymerized with, for example, an oligomer having a siloxane structure in order to enhance a flame retardancy thereof.

As to the molecular weight of the aromatic polycarbonate resins, the viscosity-average molecular weight thereof is usually 15,000 to 30,000, preferably 16,000 to 28,000, on the basis of a solution viscosity thereof as measured at 25° C. in a methylene chloride solvent. The molecular weight of the aromatic polycarbonate resins may be controlled using an aromatic monohydroxy compound. Examples of the aromatic monohydroxy compound may include m- or p-methyl phenol, m- or p-propyl phenol, p-tert-butyl phenol, long-chain alkyl-substituted phenols or the like.

As the above styrene-based resins, there may be used polymers obtained by polymerizing a styrene-based monomer, copolymers obtained by copolymerizing the styrene-based monomer with a monomer copolymerizable with the styrene-based monomer, styrene-based resins containing graft copolymers obtained by polymerizing at least the styrene-based monomer in the presence of a rubber, graft copolymers obtained by polymerizing at least the styrene-based monomer and the monomer copolymerizable with the styrene-based monomer in the presence of a rubber, or the like.

Examples of the monomer copolymerizable with the styrene-based monomer may include (meth)acrylonitrile, (meth)acrylic acid alkyl esters or the like.

The above polyphenylene ether-based resins may be homopolymers or copolymers having a structure represented by the following general formula (1):

(1)

wherein $Q^1$ is respectively halogen, primary or secondary alkyl, aryl, aminoalkyl, hydrocarbon-oxy or halogen-substituted hydrocarbon-oxy; $Q^2$ is respectively hydrogen, halogen, primary or secondary alkyl, aryl, halogen-substituted alkyl, hydrocarbon-oxy or halogen-substituted hydrocarbon-oxy; and m is a number of not less than 10.

Examples of the preferable primary alkyl group as $Q^1$ and $Q^2$ may include methyl, ethyl, n-propyl, n-butyl, n-amyl, isoamyl, 2-methylbutyl, n-hexyl, 2,3-dimethylbutyl, 2-, 3- or 4-methylpentyl or heptyl, or the like. Examples of the preferable secondary alkyl group as $Q^1$ and $Q^2$ may include isopropyl, sec-butyl or 1-ethylpropyl. More preferably, $Q^1$ is alkyl or phenyl, especially $C_1$ to $C_4$ alkyl, and $Q^2$ is a hydrogen atom.

Examples of the preferable polyphenylene ether homopolymers may include those homopolymers having 2,6-dimethyl-1,4-phenylene ether units. Examples of the preferable polyphenylene ether copolymers may include random copolymers containing the combination of the above 2,6-dimethyl-1,4-phenylene ether units and 2,3,6-trimethyl-1,4-phenylene ether units.

The polyphenylene ether-based resins have an intrinsic viscosity of usually 0.2 to 0.8 dl/g, preferably 0.2 to 0.7 dl/g, more preferably 0.25 to 0.6 dl/g as measured at 30° C. in a chloroform solvent. When the intrinsic viscosity of the polyphenylene ether-based resins is less than 0.2 dl/g, the obtained composition tends to be insufficient in impact resistance. When the intrinsic viscosity is more than 0.8 dl/g, the obtained composition tends to be deteriorated in moldability.

In the present invention, the polyphenylene ether-based resins may be used singly, or may be used in the form of a composition obtained by mixing the polyphenylene ether-based resin with the styrene-based resin. As the styrene-based resin, there may be preferably used polystyrene or rubber-reinforced polystyrene. The styrene-based resins may be blended in the composition in an amount of usually 1 to 80% by weight, preferably 5 to 50% by weight based on the total weight of the polyphenylene ether-based resin and the styrene-based resin. When the amount of the styrene-based resins blended is more than 80% by weight, the obtained composition tends to be deteriorated in heat resistance.

In the present invention, in order to impart a flame retardancy to the amorphous thermoplastic resin, a flame retardant may be added thereto. Examples of the flame retardant may include sulfonic acid metal salt-based flame retardants, halogen-containing compound-based flame retardants, antimony-containing compound-based flame retardants, phosphorus-containing compound-based flame retardants, silicon-containing compound-based flame retardants or the like. Of these flame retardants, from the standpoint of good flow, preferred are phosphorus-containing compound-based flame retardants, more preferred are phosphoric acid ester-based compounds, and especially preferred are condensed phosphoric acid esters represented by the following general formula (2):

(2)

wherein $R^1$, $R^2$, $R^3$ and $R^4$ are independently hydrogen or an organic group with the proviso that $R^1$, $R^2$, $R^3$ and $R^4$ are not hydrogen at the same time; X is a divalent or higher valent organic group; q is an integer of not less than 1; and r is an integer of not less than 1.

Examples of the organic group as $R^1$ to $R^4$ may include substituted or unsubstituted alkyl, cycloalkyl or aryl groups, etc. Examples of the substituent groups of these organic groups may include alkyl, alkoxy, aryl, aryloxy or arylthio as well as combination of these substituents such as aryla-lkoxyalkyl or combination of these substituents that are bonded to each other through oxygen, nitrogen, sulfur, alkylene or alkylidene, such as aryloxyaryl, arylsulfonylaryl and arylalkylenearyl. Of these organic groups as $R^1$ to $R^4$, preferred are aryl groups, and aryl groups substituted with $C_1$ to $C_{10}$ alkyl.

The divalent or higher valent organic group as X means such a divalent or higher valent group formed by removing one or more hydrogen atoms bonded to carbon atom from the above-mentioned organic groups. Examples of the divalent or higher valent organic group may include substituted or unsubstituted alkylene, substituted or unsubstituted arylene, substituted or unsubstituted divalent groups derived from polynuclear phenols such as phenyl-alkylene (or alkylidene)-phenyl (bisphenols), or the like. Of these groups as X, preferred are bisphenol A, hydroquinone, resorcinol, diphenyl methane, dihydroxydiphenyl and dihydroxynaphthalene.

The symbols q and r both are preferably an integer of 1 to 5. Meanwhile, the condensed phosphoric acid esters represented by the general formula (2) may be in the form of a mixture of several kinds of condensed phosphoric acid esters that are different in the symbol r from each other. Specific examples of the condensed phosphoric acid esters represented by the general formula (2) may include bisphenol A bisphosphate, hydroquinone bisphosphate, resorcin bisphosphate, resorcinol diphenylphosphate, and substituted or condensed compounds thereof. Further, these condensed phosphoric acid esters may be readily available as commercial products under the trade names such as "CR733S" (resorcinol bis(diphenylphosphate)) and "CR741" (bisphenol A bis(diphenylphosphate)) both produced by Daihachi Chemical Industry Co., Ltd., and "FP500" (resorcinol bis(dixylenylphosphate)) and "FP700" (bisphenol A bis(diphenylphosphate)) both produced by Asahi Denka Co., Ltd.

Also, in the present invention, the above flame retardant may be used together with polytetrafluoroethylene (PTFE) as a flame retarding assistant. As the PTFE, there may be suitably used, for example, those having a fibril-forming capability which tend to be readily dispersed in the amorphous thermoplastic resin to bond the resins to each other for forming a fibrous material. These PTFEs having a fibril-forming capability are classified into type III according to ASTM standard. The PTFE having a fibril-forming capability is commercially available, for example, under the trade names "TEFLON (R) 6J" and "TEFLON (R) 30J" from Du Pont-Mitsui Fluorochemicals Co., LTD. and under the trade name "POLYFLON" from Daikin Industries, Ltd.

Also, in the present invention, an impact modifier may be added to the amorphous thermoplastic resin. Examples of the impact modifier may include acrylic rubbers, styrene/hydrogenated butadiene/styrene block copolymers, styrene/hydrogenated isoprene/styrene block copolymers, AES resins, AAS resins, polybutadiene, butadiene/styrene copolymers, polyisoprene or the like. Of these compounds, preferred are acrylic rubbers, styrene/hydrogenated butadiene/styrene block copolymers, styrene/hydrogenated isoprene/styrene block copolymers, AES resins and AAS resins, and more preferred are acrylic rubbers.

Examples of the especially preferred acrylic rubbers may include multi-layered polymers containing alkyl(meth)acrylate-based polymers. The alkyl group of the alkyl(meth)acrylate-based polymers have about 1 to 8 carbon atoms. As the raw monomers for the alkyl(meth)acrylate-based polymers, there may be used ethyl acrylate, butyl acrylate, ethylhexyl acrylate and corresponding methacrylates thereof. Upon production of the alkyl(meth)acrylate-based polymers, there may also be used a cross-linking agent such as monomers having two or more ethylenically unsaturated bonds. Examples of the crosslinking agent may include alkylene diol, di(meth)acrylate, polyester di(meth)acrylate, divinyl benzene, trivinyl benzene, triallyl cyanurate, allyl (meth)acrylate or the like.

As the multi-layered polymers containing alkyl(meth) acrylate-based polymers, there may be used those multi-layered polymers comprising a core comprising a saturated or unsaturated rubber component and a shell comprising alkyl (meth)acrylate. Examples of the saturated or unsaturated rubber component may include alkyl acrylate, butadiene, butadiene/styrene copolymers, polyorganosiloxanes or the like. As the alkyl (meth)acrylate, there may be used such alkyl (meth)acrylates whose alkyl group has about 1 to 8 carbon atoms.

Further, in the present invention, the amorphous thermoplastic resin may also contain, if required, other thermoplastic resins, additives such as stabilizers, e.g., antioxidants, ultraviolet light absorbers, pigments, dyes, lubricants, other flame retardants, mold release agents and sliding modifiers, fibrous reinforcing materials such as glass fibers and carbon fibers, plate-shaped reinforcing materials such as mica, talc and glass flakes, whiskers of potassium titanate or aluminum borate, or the like, unless the addition thereof adversely affects the effects of the present invention.

In the present invention, the above amorphous thermoplastic resins may be appropriately combined with each other to form a resin composition. As an especially preferred example of such a resin composition, there may be used an amorphous thermoplastic resin composition containing an aromatic polycarbonate resin and a styrene-based resin. In this case, the amorphous thermoplastic resin composition contain the styrene-based resin in an amount of usually 1 to 90 parts by weight, preferably 5 to 70 parts by weight based on 100 parts by weight of the total amount of the aromatic polycarbonate resin and the styrene-based resin.

The amounts of the flame retardant, flame retarding assistant and impact modifier blended are as follows. That is, the flame retardant may be blended in an amount of usually 0.1 to 100 parts by weight, preferably 1 to 50 parts by weight; the flame retarding assistant may be blended in an amount of usually 0.01 to 2 parts by weight, preferably 0.05 to 1 part by weight; and the impact modifier may be blended in an amount of usually 0.1 to 20 parts by weight, preferably 1 to 10 parts by weight, all based on 100 parts by weight of the amorphous thermoplastic resin (or its composition).

The container body (1) is produced by an injection-molding method using a metal mold assembly (3) (metal mold device) shown in FIGS. 3 and 4. The metal mold assembly (3) shown in FIG. 3 is used to produce the container body (1) by an ordinary injection-molding method, and the metal mold assembly (3) shown in FIG. 4 is used to produce the container body (1) by an injection compression-molding method. In any of the molding methods, as shown in FIGS. 3 and 4, the metal mold assembly (3) used in the present invention has a cavity (30) for forming at least one surface of the flat portion (1A) of the container body (1) in which a core inert (35) is disposed on the molding surface.

More specifically, the metal mold assembly (3) shown in FIG. 3 has a cavity (30) that is defined by, for example, a stationary mold portion (31) for forming a front surface of the flat portion (1A) of the container body (1), a movable mold portion (32) for mainly forming a rear surface of the flat portion (1A), and a cover plate (33) interposed between the stationary mold portion (31) and the movable mold portion (32) for forming an outer surface of the peripheral rise portion (1B) of the container body (1).

In the metal mold assembly (3), in order to partially enhance a heat-insulating function for promoting a flow of the resin, a core insert (35) of a flat plate shape is disposed on a molding surface of the cavity (30) for forming at least one surface of the flat portion (1A), for example, on a surface of the stationary mold portion (31) facing the cavity (30). Also, a core (34) for air vent is disposed at a center of the movable mold portion (32). In addition, a sprue (not shown) is provided at a portion of the movable mold portion (32) corresponding to an end of the peripheral rise portion (1B). In the injection molding process using the metal mold assembly (3) shown in FIG. 3, similarly to ordinary injection molding processes, a molten resin is injected from a sprue gate into the cavity (30), held under dwell pressure, and then cooled and solidified in the cavity (30).

On the other hand, the basic construction of the metal mold assembly (3) shown in FIG. 4 is the same as that of the metal mold assembly shown in FIG. 3, but the former metal mold assembly is different from the latter metal mold assembly in such a point that after mold closing, the movable mold portion (32) is moved to further approach to the stationary mold portion (31) for reducing a volume of the cavity (30). More specifically, the movable mold portion (32) is formed on its end surface facing the stationary mold portion (31) with a portion engaging with an end of the cover plate (33) such that a volume of the cavity (30) varies by change in depth of engagement between the engaging portion of the movable mold portion (32) and the cover plate (33). The metal mold assemblies shown in FIGS. 3 and 4 are identical in other constructions to each other.

In the injection compression-molding method using the metal mold assembly (3) shown in FIG. 4, the metal mold assembly (3) is first closed until reaching such a position that the volume of the cavity (30) is still larger than that of a molded product. Then, upon molding, namely before or simultaneously with initiation of injecting the molten resin, during the injection or after completion of the injection, the volume of the cavity (30) is reduced until reaching the volume of the molded product, i.e., the container body (1). As described above, in the injection compression-molding method using the metal mold assembly (3) whose cavity (30) has a variable volume, the resin to be molded can be neatly fitted to a molding surface of the cavity (30), so that it is possible to further enhance a molding accuracy of the obtained thin-wall container body (1).

In the metal mold assemblies (3) shown in FIGS. 3 and 4, upon mold closing (upon reduction in cavity volume in the case of the metal mold assembly shown in FIG. 4), the volumes of the molded product (container body (1)) and the cavity (30) preferably have the following relationship:

$$0.05 \text{ mm} \leq \Delta t \leq 0.5 \text{ mm}$$

wherein $\Delta t$ represents a difference $(t_1-t_0)$ wherein $t_0$ is a thickness of the molded product, and $t_1$ is a length of the cavity (30) in the direction of thickness of the molded product (i.e., a distance between a surface of the core insert (35) disposed in the stationary mold portion (31) and a surface of the movable mold portion (32)). The reasons therefor are as follows. That is, when $\Delta t$ is less than 0.05 mm ($\Delta t<0.05$ mm), the resin to be molded may be deteriorated in flow, resulting in large residual stress in the obtained molded product. When $\Delta t$ is more than 0.5 mm ($\Delta t>0.5$ mm), air tends to be trapped in the obtained molded product, resulting in poor quality thereof.

In the metal mold assembly (3), the core insert (35) is disposed in order to improve the flow of the molten resin to be molded. The core insert (35) is made of a material having a thermal conductivity of 0.3 to 6.3 W/m·K, preferably 1.0 to 5.0 W/m·K, and a thickness of 0.5 to 5 mm, preferably 2 to 4 mm. When the thermal conductivity of the core insert (35) is more than 6.3 W/m·K, the molten resin injected into the cavity (30) tends to be rapidly cooled, resulting in poor flow of the resin. The techniques of applying the core insert to the metal mold assembly (3) are described in Japanese Patent Application Nos. 8-318534(1996), 11-042650(1999), 2000-271970 and 2002-86454 all filed by the same applicant (assignee) of the present application.

More specifically, the core insert (35) may be produced by press-molding a ceramic powder or molten glass in a mold and then heat-treating the obtained molded product, or by naturally shaping a glass plate placed on a mold in a furnace. The core insert (35) may be made of a ceramic material selected from the group consisting of $ZrO_2$, $ZrO_2$—CaO, $ZrO_2$—$Y_2O_3$, $ZrO_2$—MgO, $ZrO_2$—$CeO_2$, $K_2O$—$TiO_2$, $Al_2O_3$, $Al_2O_3$—TiC, $Ti_3N_2$ and $3Al_2O_3\cdot 2SiO_2$, or a glass material selected from the group consisting of soda glass, quartz glass, heat-resistant glass and glass ceramics. Of these materials, preferred are $ZrO_2$, $ZrO_2$—$Y_2O_3$, $ZrO_2$—$CeO_2$ and crystallized glass.

Also, when the obtained molded product is required to have a surface gloss, the core insert (35) constituting a molding surface of the cavity (30) preferably has a surface roughness (Rz) of not more than 0.5 μm. When the surface roughness Rz of the core insert (35) is more than 0.5 μm, the core insert tends to be deteriorated in specular effect, resulting in unsatisfactory properties of the obtained molded product, e.g., poor surface smoothness (poor image reflectivity) thereof. In order to achieve the good surface roughness, the surface of the core insert (35) may be lapped, for example, with diamond and further, if required, with cerium oxide. Meanwhile, the surface roughness (Rz) may be measured by the method according to JIS B 0601-2001. However, if the surface of the obtained molded product should be delustered or finished with hair lines, it is not necessary to control the surface roughness (Rz) of the core insert (35) to not more than 0.5 μm.

Further, when the core insert (35) is made of a crystallized glass, the crystallinity thereof is usually not less than 10%, preferably not less than 60%, more preferably 70 to 100%. When the crystallinity is less than 10%, there tends to arise such a problem that the core insert suffers from interfacial separation at its surface upon molding. On the other hand, when the core insert made of a crystallized glass has the above enhanced crystallinity, it is possible to uniformly disperse crystals in the whole glass material, and remarkably improve a heat shock strength thereof and eliminate the occurrence of interfacial separation, thereby considerably preventing the core insert (35) from being damaged. The glass ceramics constituting the core insert (35) preferably has a linear expansion coefficient of not more than $1\times 10^{-6}$/K and a thermal shock strength of not less than 400° C. Meanwhile, in the glass ceramics, the amount of crystal particles present in the glass base material can be represented by an index of crystallinity, and the crystallinity may be determined by measuring a ratio between amorphous phase and crystal phase in the glass material using an analyzer such as X-ray diffractometer.

The reasons for adjusting the thickness of the core insert (35) to the above range of 0.5 to 5 mm are as follows. That is, when the thickness of the core insert (35) is less than 0.5 mm, the heat-insulating effect by the core insert may become insufficient, so that the molten resin injected into the cavity (30) tends to be rapidly cooled. Also, when the core insert is attached to an insert-fitting position of the stationary mold portion (31), for example, by an adhesive, non-uniform stress tends to remain in the core insert (35) due to non-uniform thickness of the adhesive. As a result, there tend to arise problems such as wavy surface of the obtained molded product and failure of the core insert (35) due to injection pressure of the molten resin. On the other hand, when the thickness of the core insert (35) is more than 5 mm, the heat-insulting effect by the core insert may become too large, thereby inhibiting the resin within the cavity (30) from being smoothly cooled, and leading to prolonged molding cycle.

Further, in the present invention, as shown in FIG. 4, the core insert (35) may be provided on its surface facing the cavity, with a metal film (36) having a thickness of 0.01 to 0.4 mm in order to enhance a flow of the resin upon molding and a durability of the core insert (35). The metal film (36) may be made of at least one material selected from the group consisting of Cr, Cr compounds, Cu, Cu compounds, Ni and Ni compounds. Examples of the Cr compounds may include nickel-chromium alloys or the like. Examples of the Cu compounds may include copper-zinc alloys, copper-cadmium alloys, copper-tin alloys or the like. Examples of the Ni compounds may include nickel-iron alloys, nickel-cobalt alloys, nickel-tin alloys, nickel-phosphorus alloys (Ni—P-based alloys), nickel-iron-phosphorus alloys (Ni—Fe—P-based alloys), nickel-cobalt-phosphorus alloys (Ni—Co—P-based alloys) or the like. The material constituting the metal film may be selected in view of scratch resistance or thickness required therefor.

The metal film (36) may be in the form of a single layer structure or a multi-layer structure. For example, in the case where the metal film (36) is required to have a certain large thickness and a good surface hardness, the metal film (36) may have a two-layer structure including an undercoat layer made of Cu or Ni which has a desired thickness and a topcoat layer made of Cr. The metal film may be usually produced by an electroplating method or an electroless plating method.

The metal film (36) has a thickness of 0.01 to 0.4 mm, preferably 0.1 to 0.3 mm. When the thickness of the metal film (36) lies in the above-specified range, it is possible to form irregularities or the like on the metal film (36) by various methods and readily subject the metal film (36) to ordinary cutting or machining processes, and further the molten resin introduced into the cavity (30) can be effectively prevented from being rapidly cooled.

The above core insert (35) is disposed in an insert-fitting portion (recessed portion) which is engraved on the surface of the stationary mold portion (31) and has the substantially same shape as that of the core insert. The core insert (35) may be simply inserted into the insert-fitting portion or may be fixed therein through a heat-curable adhesive such as epoxy-based adhesives, urethane-based adhesives and acrylic adhesives.

Also, in the metal mold assembly (3), the cover plate (33) is mounted to the stationary mold portion (31) so as to cover an outer periphery of the insert-fitting portion and hold the core insert (35) thereunderneath. In order to prevent the core insert (35) previously disposed in the stationary mold portion (31) from being damaged, a preferable clearance (C) may be formed between the core insert (35) and the cover plate (33). The clearance (C) between the core insert (35) and the cover plate (33) is not more than 0.03 mm, more practically 0.001 to 0.03 mm.

The reasons for adjusting the clearance (C) to the above-specified range are as follows. That is, when the clearance (C) is less than 0.001 mm, the cover plate (33) may be contacted with an outer periphery of the core insert (35) due to deformation of the cover plate (33) practically caused upon mounting thereof, resulting in occurrence of fine cracks on the core insert. Further, the core insert (35) and the cover plate (33) may be brought into contact with each other due to thermal expansion of the stationary mold portion (31), the cover plate (33) and the core insert (35) upon increase in the mold temperature, resulting in failure of the core insert (35). On the other hand, when the clearance (C) is more than 0.03 mm, the molten resin tends to be penetrated between the core insert (35) and the cover plate (33), resulting in occurrence of cracks on the core insert (35) or formation of burrs on the obtained molded product.

A covering amount of the cover plate (33) overhung over the insert-fitting portion of the stationary mold portion (31), i.e., a amount of overlapping (ΔS) of the cover plate (33), may be set to 0.1 to 2.0 mm. The reasons for adjusting the amount of overlapping (ΔS) to the above-specified range are as follows. That is, when the amount of overlapping (ΔS) is more than 2.0 mm, the respective parts of the metal mold assembly (3) tend to be undesirably increased in size. On the other hand, when the amount of overlapping (ΔS) is less than 0.1 mm, a fine path directly communicated with the peripheral gap around the core insert (35) is formed, so that the molten resin is penetrated into the gas therethrough, resulting in formation of fine cracks at the outer peripheral portion of the core insert (35) which may further lead to failure of the core insert (35) due to growth of such cracks. Meanwhile, in order to prevent unexpected contact between the respective members including the core insert due to thermal expansion thereof, the core insert (35) may be preferably provided at an edge of its surface facing the cavity (30), with a curved surface having a radius of curvature of not less than 0.3 mm or a C-shaped cut surface in order to avoid the occurrence of concentrated stress thereon.

As described above, in the present invention, the specific core insert (35) is disposed on the molding surface of the cavity (30) of the metal mold assembly (3), so that it is possible to lower the injection pressure of the molten resin and reduce the residual stress remaining on the obtained container body (1) as a molded product, thereby effectively preventing deformation of the thus obtained container body (1) after molding. Thus, since the injection pressure of the molten resin is lowered, it also becomes possible to reduce the thickness of the respective members of the metal mold assembly (3), resulting in reduction in size of the molding apparatus as a whole, and low costs.

In the container body (1) of the present invention produced by using the above metal mold assembly (3), the flat portion (1A) thereof has an area of 1 to 100 cm$^2$, and the peripheral rise portion (1B) thereof has a height of 0.5 to 10 mm according to configurations of electric parts accommodated and used therein. In addition, the wall thickness of the peripheral rise portion (1B) may be usually adjusted to 0.3 to 0.7 mm from the standpoints of enhanced rigidity of the container body (1) and enhanced accommodation capacity for contents such as electric parts. Also, in order to further enhance the accommodation capacity for contents such as electric parts, an average wall thickness of the flat portion (1A) is adjusted to not more than 0.25 mm, preferably not more than 0.2 mm. Further, in the present invention, in order to enhance not only the accommodation capacity of contents such as electric parts but also improve the assembling accuracy, the flatness of the flat portion (1A) is adjusted to not more than 0.5 mm.

The reasons for adjusting the flatness of the flat portion (1A) to the above-specified range are as follows. That is, when the flatness of the flat portion (1A) is more than 0.5 mm, it may not be possible to completely contact the edge of the peripheral rise portion (1B) of the container body (1) with the lid (2), resulting in defective bonding therebetween. Further, in some cases, it may be impossible to attach a jig used in the above bonding process to the container body (1).

The flatness of the flat portion (1A) is measured using a three-dimensional structure measuring apparatus equipped with a low-pressure probe with a low contact pressure or a non-contact laser probe in order to prevent the occurrence of deflection on the flat portion (1A). More specifically, the container body (1) as a specimen is placed on a corrected surface plate of the three dimensional structure measuring apparatus as a reference surface, to measure the flatness of a region of less than 2 mm from an outer periphery of the flat portion (1A) and estimate the difference from the standard surface (height of irregularities) by method of least square. The reason for measuring the flatness of only the region extending at a specific distance inwardly from the outer periphery of the flat portion (1A) in the above measurement is that a region of the flat portion (1A) which is spaced apart by 2 mm or more from the outer periphery thereof is susceptible to adverse influence of surface waviness and, therefore, tends to be deteriorated in measuring accuracy. In the above measurement, it is required at least to measure the flatness at four corner positions of the flat portion (1A) as well as four intermediate positions between the adjacent corner positions.

Further, in the present invention, the flat portion (1A) has a surface waviness (Pz) of not more than 50 μm, preferably not more than 30 μm, more preferably not more than 10 μm. The surface waviness (Pz) of the flat portion (1A) is a value obtained by measuring the difference between a maximum height and a minimum height which are parallel with an ideal plane of the surface to be measured, over a maximum measuring length of 30 mm using a surface roughness tester. Meanwhile, if the size of the molded product to be measured is less than 30 mm, a measurable largest length thereof may be used as the maximum measuring length. Furthermore, the sink mark depth of the flat portion (1A) is adjusted to not more than 3 μm, preferably not more than 2 μm, more preferably not more than 1 μm. The sink mark depth of the flat portion (1A) is determined as follows. That is, the surface roughness of a region and its surrounding portion on the surface to be measured where sink marks are formed is measured by a surface roughness tester to obtain a waviness curve thereof. Then, from the obtained waviness curve, a distance between a tangent line of a higher inflection point and a tangent line of a lower inflection point is determined as the sink mark depth. Meanwhile, the above surface waviness (Pz) and sink mark depth are measured according to JIS B 0601-2001.

In the container of the present invention, the lid (2) is bonded to the edge of the peripheral rise portion (1B) of the container body (1). As shown in FIGS. 1 and 2, in the case where the lid (2) comprises a flat portion (2A) and a peripheral rise portion (2B) formed along an outer periphery of the flat portion (2A) similarly to the container body (1), the edge of the peripheral rise portion (2B) of the lid (2) is abutted and bonded to the edge of the peripheral rise portion (1B) of the container body (1). The bonding between the container body (1) and the lid (2) may be performed by an adhesion method using an adhesive or an ultrasonic welding method. As well known in the art, the ultrasonic welding method is a welding method in which ultrasonic vibration is applied to two resin products that are contacted with each other for integrally melt-bonding the contacted portions of the resin products.

The container of the present invention is produced by the injection-molding method using the above specific metal mold assembly (3). Therefore, the amorphous resin inherently having a poor flow can be enhanced in flow upon molding, so that it is possible to produce a container having a high dimensional accuracy. In addition, since the flat portion (1A) of the container body (1) and the flat portion (2A) of the lid (2) have a wall thickness as small as not more than 0.25 mm and a flatness of not more than 0.5 mm, it is possible to not only weld the container body (1) and the lid (2) together without any gaps therebetween, but also further enhance an accommodation capacity for contents such as electric parts. Further, the container of the present invention has a good appearance and, therefore, a high commercial value.

As described above, in the resin container of the present invention, since at least the flat portion (1A) of the container body (1) has a wall thickness as small as not more than 0.25 mm and a flatness of not more than 0.5 mm, it is possible to weld the container body (1) and the lid (2) together without any gas therebetween and further enhance an accommodation capacity for contents such as electric parts. In addition, the resin container has a good appearance and, therefore, can show a high commercial value. Thus, according to the present invention, there is provided an industrially useful resin container.

EXAMPLES

The present invention will be described in more detail by reference to the following examples. However, these examples are only illustrative and not intended to limit the present invention thereto.

Example 1

The metal mold assembly as shown in FIG. 3 was used to produce the container for battery packs as shown in FIG. 1. The container body (1) was formed such that the flat portion (1A) thereof had a size of 40 mm×40 mm×0.2 mm (thickness), and the peripheral rise portion (1B) thereof had a size of 5 mm (height)×0.5 mm (thickness).

The cavity (30) of the metal mold assembly (3) was adjusted to the substantially same dimension as that of the container body (1), and the core insert (35) made of partially stabilized zirconia was disposed within the cavity (30). The core insert (35) was of a flat rectangular parallelopiped shape having an outer dimension of 42 mm×42 mm×5 mm (thickness), and exhibited a thermal conductivity of 4.2 W/m·K. Also, the core insert (35) was formed at its outer peripheral edge with a C-shaped cut surface having a radius of curvature of 0.3 mm, and its surface facing the cavity (30) was mirror-polished. The mirror-polished surface of the core insert (35) had a surface roughness (Rz) of 0.03 μm.

The core insert (35) was fixed in an insert-fitting portion of the stationary mold portion (31) through an epoxy-based adhesive. The clearance (C) between the core insert (35) and the cover plate (33) was adjusted to 0.003 mm, and the amount of overlapping (ΔS) of the cover plate (33) was adjusted to 0.8 to 1.2 mm.

The above metal mold assembly (3) was mounted to an injection-molding machine manufactured by Nissei Plastic Industrial Co., Ltd., by which the thermoplastic resin 1 shown in the following Table 1 was injection-molded. Upon the injection-molding process, the movable mold portion (32) was actuated to close the mold. After adjusting the resin temperature, mold temperature and mold-clamping pressure to 300° C., 70° C. and 50 MPa, respectively, the molten resin was injected into the cavity (30) at an injection velocity of 200 mm/sec. Successively, the resin within the cavity (30) was cooled and solidified. Then, the mold was opened to remove the obtained container body (1) as the molded product therefrom. The above molding procedure was repeated to produce 200,000 container bodies (1).

TABLE 1

|  | Kind | Resin 1 (wt. part) | Resin 2 (wt. part) |
| --- | --- | --- | --- |
| Polycarbonate | F-1 | 100 | — |
|  | F-2 | — | 80 |
| Styrene-based resin | G | — | 20 |
| Phosphorus-containing compound-based flame retardant | H-1 | 12 | — |
|  | H-2 | — | 17.5 |
| Polytetra-fluoroethylene | I | 0.3 | 0.5 |
| Thermoplastic elastomer | J | 6 | — |

Meanwhile, the materials shown in "Kind" of Table 1 are commercially available products known under the following trade names:

F-1: "IUPILON H-3000" produced by Mitsubishi Engineering-Plastics Corporation;

F-2: "IUPILON S-2000" produced by Mitsubishi Engineering-Plastics Corporation;

G: "DP-611" produced by Techno-polymer Co., Ltd.;

H-1: "ADEKASTAB FP500" produced by Asahi Denka Co., Ltd.;

H-2: "ADEKASTAB FP700" produced by Asahi Denka Co., Ltd.;

I: "TEFLON 6-J" produced by Du Pont-Mitsui Fluorochemicals Co., LTD.; and

J: "PARALLOID EXL2603" produced by Mitsubishi Rayon Co., Ltd.

As a result of visually observing each of the thus obtained injection-molded container bodies (1), it was confirmed that the flat portion (1A) thereof was substantially free from warping, waviness and sink marks. The flatness of the flat portion (1A) was measured at four corner positions located 1 mm inwardly from an outer periphery thereof as well as four intermediate positions between the adjacent corner positions using a three-dimensional structure measuring apparatus equipped with a low-pressure probe (manufactured by Mitutoyo Corporation). As a result, it was confirmed that the flatness of the flat portion (1A) was 0.335 mm. Further, the surface waviness (Pz) of the flat portion (1A) was measured using a surface roughness tester "SURFCOM" manufactured by TOKYO SEIMITSU CO., LTD. to prepare a waviness curve thereof, and further the sink mark depth of the flat portion (1A) was determined based on the thus prepared waviness curve. As a result, it was confirmed that the flat portion (1A) had a surface waviness (Pz) of 5 μm and a maximum sink mark depth of 0.2 μm.

Next, the same number of the lids (2) as that of the container bodies (1) were produced by the same injection-molding method as used for production of the container bodies (1). As a result, it was confirmed that the flat portion (2A) of the respective lids (2) were substantially free from warping, waviness and sink marks. Also, the flatness, surface waviness (Pz) and sink mark depth of the flat portion (2A) were measured by the same method as described above. As a result, it was confirmed that the flat portion (2A) had a flatness of 0.375 mm, a surface waviness (Pz) of 4 µm and a maximum sink mark depth of 0.7 µm. When the edge of the peripheral rise portion (1B) of the container body (1) was abutted onto the edge of the peripheral rise portion (2B) of the lid (2), both the edges could be brought into close contact with each other without gaps therebetween, so that the container body (1) and the lid (2) could be bonded together by an ultrasonic welding method without any gaps therebetween. Meanwhile, although the above injection-molding procedure was repeated 200,000 times, it was recognized that the core insert (35) was free from any scratches or damages.

Example 2

The same procedure as defined in Example 1 was conducted by using the same metal mold assembly (3) and the same injection-molding method and conditions as those of Example 1 except that the thermoplastic resin 2 shown in Table 1 was used, thereby producing a container having the same structure as that of Example 1. As a result, it was confirmed that the flat portion (1A) of the container body (1) was substantially free from warping, waviness and sink marks. In addition, from the measurement, it was confirmed that the flat portion (1A) had a flatness of 0.285 mm, a surface waviness (Pz) of 3.7 µm and a maximum sink mark depth of 0.6 µm. Also, it was confirmed that the flat portion (2A) of the lid (2) was substantially free from warping, waviness and sink marks. In addition, from the measurement, it was confirmed that the flat portion (2A) had a flatness of 0.293 mm, a surface waviness (Pz) of 4 µm and a maximum sink mark depth of 0.8 µm. Then, the container body (1) and the lid (2) were bonded to each other by the same method as used in Example 1. As a result, it was confirmed that the container body (1) and the lid (2) could be welded together without any gaps therebetween, and the core insert (35) was free from any scratches or damages after repeated use.

Example 3

The metal mold assembly (3) as shown in FIG. 4 was used to produce the container for battery packs as shown in FIG. 1 which had the same structure as produced in Example 1. The metal mold assembly used in this Example was substantially the same as that used in Example 1 except that the core insert (35) was provided on its surface with a metal film (36). More specifically, the core insert (35) was subjected to electroless phosphorus-nickel plating process to form the metal film (36) having a thickness of 0.15 mm over a whole surface thereof. The surface of the thus formed metal film facing the cavity (30) was machined and polished to obtain a mirror-finished surface having a surface roughness (Rz) of 0.03 µm. The mounting conditions of the core insert (35) were the same as used in Example 1.

The above metal mold assembly (3) was mounted to an injection-molding machine manufactured by Toshiba Machine Co., Ltd., by which the same thermoplastic resin 1 as used in Example 1 was injection-molded. Upon the injection-molding process, the movable mold portion (32) was actuated to close the mold. After adjusting the resin temperature, mold temperature and mold-compressing pressure to 300° C., 70° C. and 40 tons, respectively, the molten resin was injected into the cavity (30) at an injection velocity of 200 mm/sec. Upon completion of the injection, the movable mold portion (32) was simultaneously actuated to approach further 1 mm to the stationary mold portion (31) and compress the cavity (30). Successively, the resin within the cavity (30) was cooled and solidified. Then, the mold was opened to remove the obtained container body (1) as the molded product therefrom. The above molding procedure was repeated to produce 200,000 container bodies similarly to Example 1.

As a result of visually observing each of the thus obtained container bodies (1), it was confirmed that the flat portion (1A) thereof was substantially free from warping, waviness and sink marks. The flatness, surface waviness (Pz) and sink mark depth of the flat portion (1A) were measured by the same method as used in Example 1. As a result, it was confirmed that the flat portion (1A) had a flatness of 0.287 mm, a surface waviness (Pz) of 5 µm and a maximum sink mark depth of 0.7 µm.

Next, the same number of the lids (2) as that of the container bodies (1) were produced by the same method as used for production of the container body (1). As a result, it was confirmed that the flat portion (2A) of the respective lids (2) were substantially free from warping, waviness and sink marks. Also, the flatness, surface waviness (Pz) and sink mark depth of the flat portion (2A) were measured by the same method as described above. As a result, it was confirmed that the flat portion (2A) had a flatness of 0.294 mm, a surface waviness (Pz) of 4.6 µm and a maximum sink mark depth of 0.8 µm. When the edge of the peripheral rise portion (1B) of the container body (1) was abutted onto the edge of the peripheral rise portion (2B) of the lid (2), both the edges could be brought into close contact with each other without any gaps therebetween, so that the container body (1) and the lid (2) were bonded together by an ultrasonic welding method without any gaps therebetween. Meanwhile, although the above injection-molding procedure was repeated 200,000 times, it was recognized that the metal film (36) formed on the surface of the core insert (35) was free from any scratches or damages.

Example 4

The same procedure as defined in Example 3 was conducted by using the same metal mold assembly (3) and the same injection-molding method and conditions as those of Example 3 except that the thermoplastic resin 2 shown in Table 1 was used, thereby producing a container having the same structure as that of Example 3. As a result, it was confirmed that the flat portion (1A) of the container body (1) was substantially free from warping, waviness and sink marks. In addition, from the measurement, it was confirmed that the flat portion (1A) had a flatness of 0.28 mm, a surface waviness (Pz) of 4.5 µm and a maximum sink mark depth of 0.6 µm. Also, it was confirmed that the flat portion (2A) of the lid (2) was substantially free from warping, waviness and sink marks. In addition, from the measurement, it was confirmed that the flat portion (2A) had a flatness of 0.283 mm, a surface waviness (Pz) of 4.7 µm and a maximum sink mark depth of 0.7 µm. Further, the container body (1) and the lid (2) could be welded to each other without any gaps therebetween by the same method as used in Example 1.

Further, it was confirmed that the core insert (35) was free from any scratches or damages even after repeating the molding procedure.

Comparative Example 1

The metal mold assembly (3) as shown in FIG. 3 was used to produce the container for battery packs as shown in FIG. 1 which had the same structure as that of Example 1. The metal mold assembly (3) used was substantially the same as that used in Example 1 except that the core insert (35) was made of a different material from that of Example 1. More specifically, the core insert (35) was made of a steel material (trade name: "STAVAX"), and exhibited a thermal conductivity of 41.8 W/m·K. In addition, the surface roughness (Rz) of the core insert (35) was adjusted to the same value as that of Example 1, i.e., 0.03 μm. The mounting conditions of the core insert (35) were the same as used in Example 1.

The injection-molding process was conducted using the thermoplastic resin 1 shown in Table 1. Although the injection-molding process was initiated under the same conditions as used in Example 1, it was not possible to completely fill the resin into the cavity (30). Namely, the resin was filled at the region having the thickness of 0.5 mm, but the could not be filled at the region having the thickness of 0.2 mm. Therefore, in the course of the injection-molding process, the injection velocity was raised up to 1,500 mm/sec. The other molding operations were conducted in the same manner as in Example 1. The above molding procedure was repeated to produce 200,000 container bodies (1).

As a result of visually observing each of the thus obtained container bodies (1), it was apparently recognized that the flat portion (1A) thereof suffered from warping, waviness and sink marks. The flatness, surface waviness (Pz) and sink mark depth of the flat portion (1A) were measured by the same method as used in Example 1. As a result, it was confirmed that the flat portion (1A) had a flatness of 0.63 mm, a surface waviness (Pz) of 85 μm and a maximum sink mark depth of 4.7 μm.

Next, the same number of the lids (2) as that of the container bodies (1) were produced by the same method as used for production of the container body (1). As a result, it was confirmed that the flat portion (2A) of the respective lids (2) suffered from warping, waviness and sink marks to the same extent as the container body (1). When the edge of the peripheral rise portion (1B) of the container body (1) was abutted onto the edge of the peripheral rise portion (2B) of the lid (2), gaps were formed therebetween. As a result, it was not possible to weld the container body (1) and the lid (2) together. Meanwhile, the surface of the core insert (35) was free from scratches or damages.

What is claimed is:

1. An injection molded resin container comprising an injection molded container body and a lid for closing the container body, said container body being produced by injecting molten amorphous thermoplastic resin into a cavity of a mold assembly having a cavity for forming a recessed flat portion and a peripheral rise portion of the container; said resin container comprising the peripheral rise portion and the recessed flat portion defined by the peripheral rise portion, said peripheral rise portion having a height of 0.5 to 10 mm, and said recessed flat portion having an area of 1 to 100 $cm^2$, an average wall thickness of not more than 0.25 mm and a flatness of not more than 0.5 mm, and said container body is injection molded.

2. A resin container according to claim 1, which constitutes an outer shell for electric parts.

3. A resin container according to claim 1, wherein the container body has a rectangular parallelepiped shape, and longitudinal and lateral lengths of the flat portion are larger than the height of the peripheral rise portion.

4. A resin container according to claim 1, wherein the flat portion has a surface waviness of not more than 50 μm.

5. A resin container according to claim 1, wherein the flat portion has a sink mark depth of not more than 3 μm.

6. A resin container according to claim 1, wherein the lid is bonded to an edge of the peripheral rise portion of the container body.

7. A resin container according to claim 6, wherein the container body and the lid are bonded to each other by a welding method.

8. A resin container according to claim 1, wherein the injection molded container body is produced by a process comprising injection compression-molding an amorphous thermoplastic resin in a metal mold assembly having a cavity with a variable volume, which is reduced in volume upon molding.

9. A method for producing a resin container comprising the steps of:
   injection-molding an amorphous thermoplastic resin to form a container body, wherein
   the injection-molding step uses a metal mold assembly having a cavity for forming at least one surface of the flat portion in which a core insert is disposed, said core insert having a thermal conductivity of 0.3 to 6.3 W/m·K and a thickness of 0.5 to 5 mm, and wherein the container body container comprises a peripheral rise portion and a recessed flat portion defined by the peripheral rise portion, said peripheral rise portion having a height of 0.5 to 10 mm, and said recessed flat portion having an area of 1 to 100 $cm^2$, an average wall thickness of not more than 0.25 mm and a flatness of not more than 0.5 mm.

10. The method according to claim 9, wherein the core insert is provided on its surface facing the cavity, wherein the core insert is a metal film having a thickness of 0.01 to 0.4 mm.

* * * * *